(12) United States Patent
Heppe

(10) Patent No.: US 9,522,733 B2
(45) Date of Patent: Dec. 20, 2016

(54) AIRSHIP LAUNCH FROM A CARGO AIRSHIP

(75) Inventor: Stephen Heppe, Hood River, OR (US)

(73) Assignee: STRATOSPHERIC AIRSHIPS, LLC, Hood River, OR (US)

( * ) Notice: Subject to any disclaimer, the term of this patent is extended or adjusted under 35 U.S.C. 154(b) by 1186 days.

(21) Appl. No.: 13/347,371

(22) Filed: Jan. 10, 2012

(65) Prior Publication Data

US 2012/0312911 A1    Dec. 13, 2012

Related U.S. Application Data

(63) Continuation-in-part of application No. 13/159,215, filed on Jun. 13, 2011, now Pat. No. 8,864,063.

(51) Int. Cl.
| | |
|---|---|
| *B64D 5/00* | (2006.01) |
| *B64D 17/80* | (2006.01) |
| *B64B 1/06* | (2006.01) |
| *B64B 1/40* | (2006.01) |
| *B64B 1/62* | (2006.01) |

(52) U.S. Cl.
CPC . *B64D 5/00* (2013.01); *B64B 1/06* (2013.01); *B64B 1/40* (2013.01); *B64B 1/62* (2013.01); *B64D 17/80* (2013.01)

(58) Field of Classification Search
CPC .............. B64B 1/58; B64B 1/62; B64B 1/64; B64B 1/40; B64B 1/50; B64C 37/02; B64D 5/00
USPC ......................................................... 244/30
See application file for complete search history.

(56) References Cited

U.S. PATENT DOCUMENTS

| | | | |
|---|---|---|---|
| 1,549,061 A | 5/1923 | Chenu | |
| 1,372,924 A | 3/1929 | Anderson | |
| 1,818,138 A | 8/1931 | Howland | |
| 2,758,804 A * | 8/1956 | Hakomaki | ................ 244/31 |
| 2,863,618 A | 12/1958 | Doyle et al. | |
| 4,082,063 A | 4/1978 | Strickland | |
| 4,497,272 A * | 2/1985 | Veazey | ........... B63H 9/0685 |
| | | | 114/102.29 |
| 4,995,572 A | 2/1991 | Piasecki | |
| 5,333,817 A * | 8/1994 | Kalisz et al. | ............. 244/97 |
| 5,857,645 A | 1/1999 | Hodgson | |
| 6,220,543 B1 | 4/2001 | Uskolovsky | |
| 7,055,777 B2 | 6/2006 | Colting | |

(Continued)

FOREIGN PATENT DOCUMENTS

| | | |
|---|---|---|
| GB | 2141088 A | 12/1984 |
| WO | 2005081680 A2 | 9/2005 |

OTHER PUBLICATIONS

Gazder, Ryan, P., Pant, Rajkumar, S., "A Comparative Evaluation of Operation of Airships and Helicopters in Uttaranchal." Department of Aerospace Engineering, IIT Bombay, Powai, Mumbai 400076, p. 7.*

(Continued)

*Primary Examiner* — Joseph W Sanderson
*Assistant Examiner* — Magdalena Topolski
(74) *Attorney, Agent, or Firm* — Fabian VanCott; Jeffrey Riddle

(57) ABSTRACT

A method for launch of an airship includes connecting a cargo airship to a deflated second airship, launching the cargo airship, inflating the second airship with lifting gas carried by the cargo airship while aloft; and releasing the second airship from the cargo airship. A high-altitude airship launch system is also provided.

27 Claims, 12 Drawing Sheets

(56) References Cited

U.S. PATENT DOCUMENTS

| | | | |
|---|---|---|---|
| 7,341,224 B1* | 3/2008 | Osann, Jr. | .................... 244/30 |
| 7,708,222 B2 | 5/2010 | Lee | |
| 8,061,648 B2 | 11/2011 | Lachenmeier | |
| 2002/0175243 A1* | 11/2002 | Black | .................... B64B 1/02 |
| | | | 244/97 |
| 2004/0195431 A1 | 10/2004 | Yumlu et al. | |
| 2008/0179453 A1 | 7/2008 | Thompson | |
| 2012/0234965 A1 | 9/2012 | Heppe | |

OTHER PUBLICATIONS

Khoury, Gabriel, A., "Airship Technology." Second Edition. Cambridge. pp. 285-286.*

Petrussa, Annette, "Airship", http://www.madehow.com/Volume-3/Airship.html.*

Woolard; The Mitre Digest; 12 Miles High; An Integrated Airship-Radar is on the Horizon, Mar. 19, 2010.

Naval Research Advisory Committe, Lighter-Than-Air Systems for Future Naval Missions, Flag Officers and Senior Executive Service, The Pentagon Auditorium, Oct. 4, 2005.

Sanswire Corporation, Unmanned Airship Solutions for Integrated ISR Systems; Technical White Paper, Jul. 24, 2007; www.sansire.com.

Graham Warwick, Higher ground: Stratospheric airships special report; Aug. 15, 2006; Washington DC-Flight International; www.flightglobal.com.

Craig L. Nickol et al., High Altitude Long Endurance UAV Analysis of Alternatives and Technology Requirements Development, NASA/TP-2007-214861; Mar. 2007.

George D. Modica et al., An Investigation of Stratospheric Winds in Support of the High Altitude Airship, Atmospheric and Environmental Research, Inc., Lexington, Massachusetts Systems Technology, Inc., Hawthorne, California; Jan. 22, 2008.

JP Aerospace, Something new at the boundary of Earth and space; Tandem Class Airships, http://www.jpaerospace.com/Tandem/tandem.html[Nov. 20, 2010 4:50:26 PM].

* cited by examiner

AIRSHIP LAUNCH FROM A CARGO AIRSHIP

RELATED DOCUMENTS

The present application is a continuation-in-part and claims the benefit under 35 U.S.C. §120 to U.S. application Ser. No. 13/159,215, to Stephen Heppe, filed Jun. 13, 2011 and entitled "Tethered Airships," which is incorporated herein by reference in its entirety.

BACKGROUND

High-altitude airships can be used as platforms for a variety of missions, including weather and astronomical observations. High-altitude airships are typically designed to be lightweight and hold large volumes of lifting gas to provide the desired amount of buoyancy in the upper atmosphere. A stratospheric balloon or airship is generally designed with a light-weight hull to contain lifting gas while minimizing overall airship mass. For example, airships intended for operation in the upper stratosphere may have a hull with a thickness that is less than 50 µm and an areal density less than 100 g/m² of effective hull surface area, with a surface area on the order of tens of thousands of square meters.

The large surface area and thin hull can make the airship vulnerable to damage, particularly during launch. To launch an airship, a suitable launch site is selected and a launch window is selected when little or no wind is anticipated. The conventional launch method restricts the amount of slack balloon material that is subject to wind drag or "sail" effect during the launch. The launch site also includes a large open area where the balloon can be laid out and inflated without risk of the fragile hull coming into undesirable contact with external objects. Typically, the bulk of the balloon is laid out lengthwise on a suitable launch surface. Very large balloons (20-40 million cubic feet displacement; 500,000 to 1,000,000 cubic meters displacement) can require 800 ft (240 meters) or more of layout space. The top portion of the balloon is placed under a roller arm of a launch vehicle. This launch vehicle confines the lifting gas to the top portion of the balloon during inflation. At the completion of inflation, the launch arm is released and the balloon rises vertically over a payload release vehicle. Typically this payload release vehicle includes a crane that suspends the payload. The payload release vehicle can be driven downwind to minimize the wind effects on the hull. Even with these precautions, these launch techniques can only be used in calm or near calm winds and still result in a significant risk of the hull and/or payloads being damaged. Further, these operational constraints severely limit the locations and times that a high-altitude balloon can be launched.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

The figures and specification below describe a two stage deployment concept that includes a robust low-altitude airship that can carry a high-altitude airship as a payload, and deploy it at a suitable altitude. The low-altitude airship can be launched (along with its cargo) from a convenient launch site and flown to a different site for the deployment and launch of the high-altitude airship. This enables direct insertion into difficult environments such as polar or mid-oceanic areas.

The robust low-altitude airship can be launched in a greater variety of wind conditions and a greater variety of launch sites (airports), as compared to a fragile high-altitude airship, thereby increasing launch opportunities and reducing certain transportation and logistics costs. Also, by deploying the high-altitude airship at a suitable altitude away from the ground while the low-altitude airship (which may also be called the cargo airship, first-stage airship, or other suitable name) is in drifting flight, airspeed and wind gusts are minimized, thereby easing the launch of the high-altitude airship and minimizing the potential for damage.

The inventive concepts represent a technological alternative to the special-purpose launch site and special-purpose support equipment and personnel typically required for the launch of high-altitude airships. Additionally, less handling of the balloon is required and risk of damage to the hull is considerably reduced.

Some or all of the expense of building and operating the low-altitude airship is offset by the avoided expenses associated with the prior-art special-purpose launch site and special-purpose support equipment typically required for the launch of high-altitude airships. Also, because of the increased operational flexibility of the inventive concept, its costs can be amortized over a greater number of launches.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples. In some cases, the components shown in the figures may not be drawn to scale. Further, the relative scale of the components in a given figure may be varied for purposes of illustration.

Figure 1A:
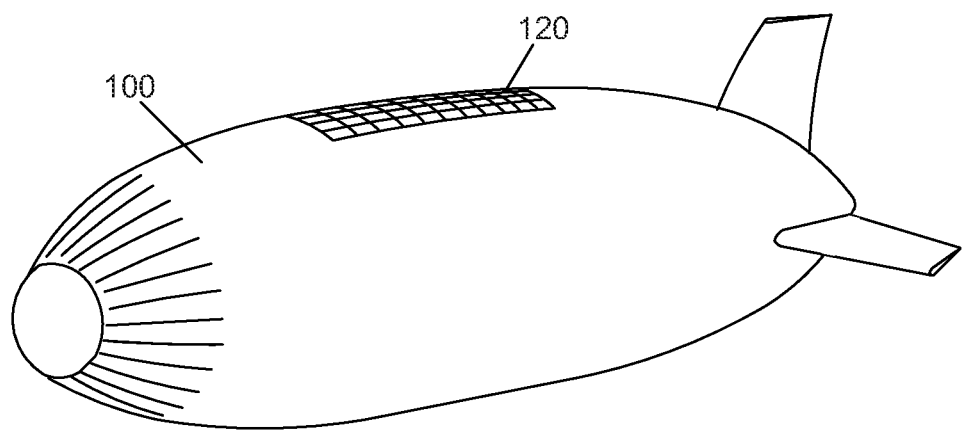
FIGS. 1A and 1B show illustrative cargo airships with payload doors that can be opened when launching a high-altitude airship, according to one example of principles described herein.

FIG. 1A illustrates the general outline of a cargo airship 100 equipped with a payload bay door or flap 120 on its upper surface. The cargo airship 100 could also be described as a "low-altitude airship", "first stage airship", "launch airship", "logistics tug", or other appellations. A payload bay, which is located inside the airship 100, contains a high-altitude airship intended to be launched using the inventive concept. The payload bay communicates with the outside environment via the payload bay door or flap 120. The cargo airship 100 comprises sufficient buoyant volume, separated from the payload bay, to carry itself and its payload to a desired deployment altitude. The cargo airship 100 may be manned, unmanned, or optionally manned. The cargo airship 100 may include other subsystems such as energy or fuel storage subsystems, propulsion subsystems, aerodynamic control subsystems (such as lifting surfaces and/or aerodynamic control surfaces), buoyancy control subsystems, and communications, navigation, and control subsystems appropriate to the manning concept employed. The payload comprises the high-altitude airship intended to be launched, all necessary support hardware, and a source of lifting gas for the high-altitude airship such as e.g. tanks of compressed hydrogen or helium, or a reservoir of chemical stocks that can be used to generate hydrogen gas at will.

Figure 1B:
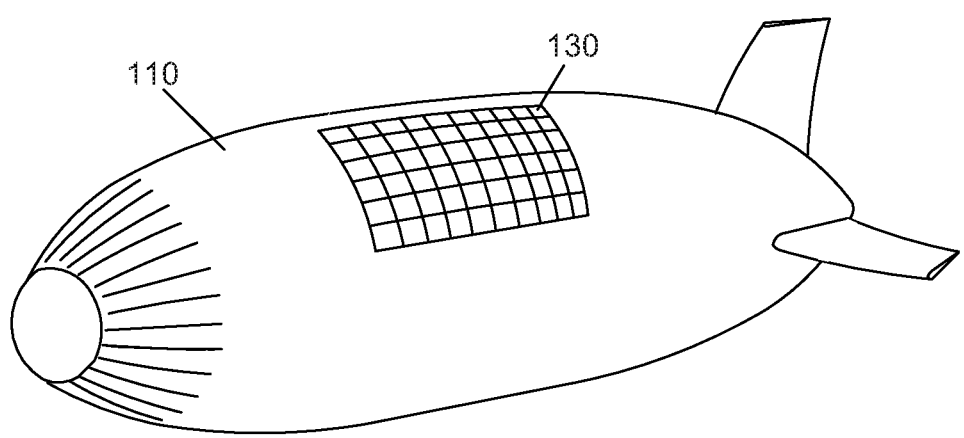

FIG. 1B illustrates the general outline of a cargo airship 110, similar in many respects to the cargo airship 100 previously illustrated, equipped with a payload bay door or flap 130 on its upper and lateral surface.

Figure 1C:
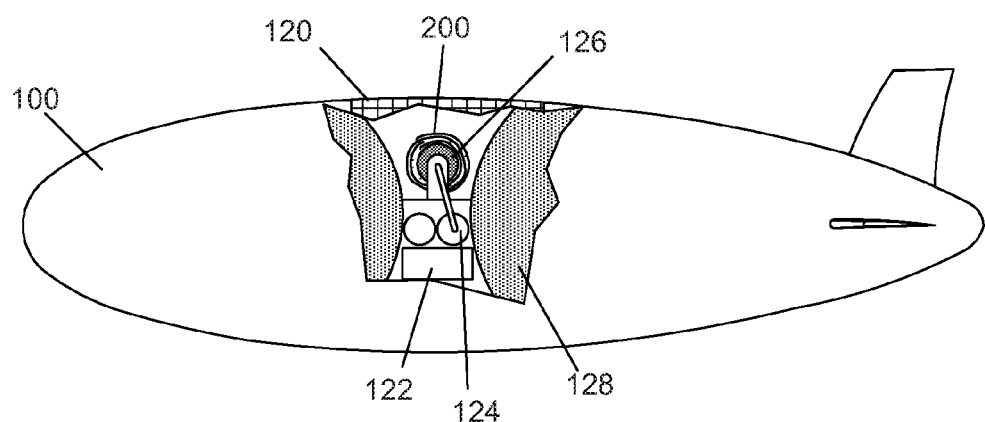
FIG. 1C is a side view of an illustrative cargo airship that has been partially cut away to show storage of a high-altitude airship and launching apparatus, according to one example of principles described herein.
Figure 1D:
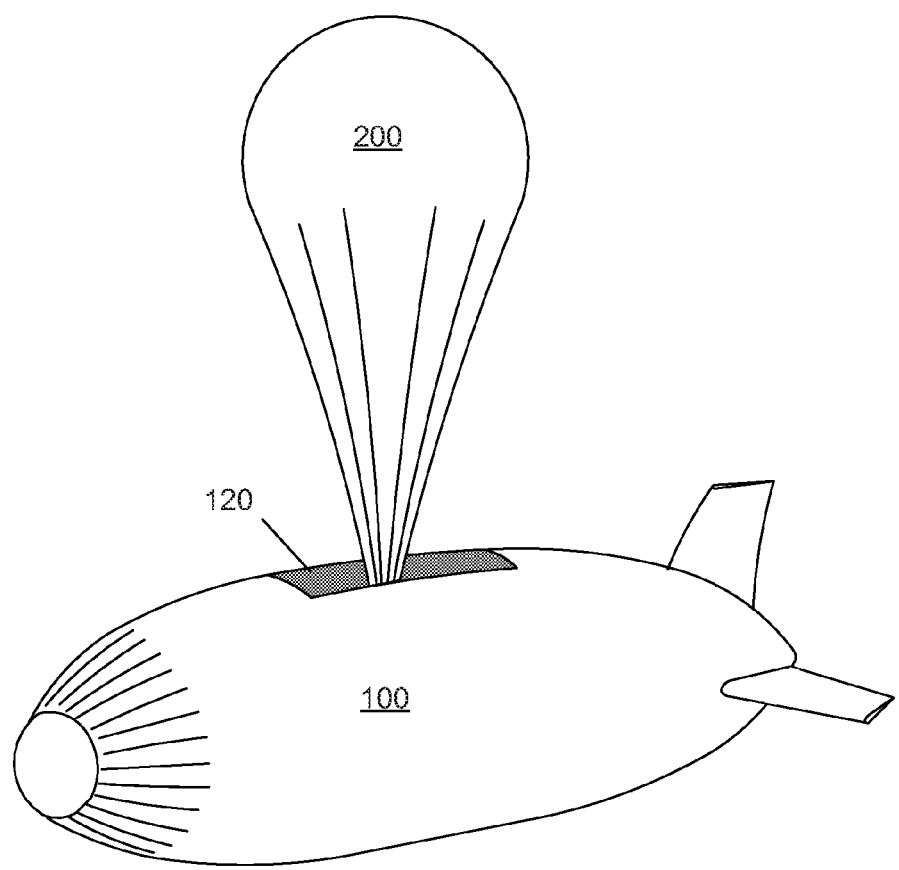
FIG. 1D shows an illustrative high-altitude airship being launched from a cargo airship, according to one embodiment of principles described herein.
Figure 1E:
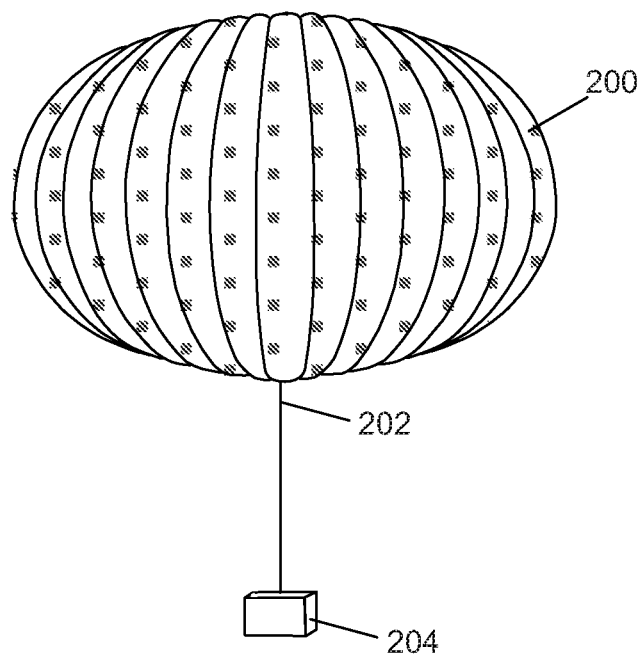
FIG. 1E is a side view of a high-altitude airship and payload at altitude, according to one example of principles described herein.

FIG. 1C is a side view of an illustrative cargo airship 100 that has been partially cut away to show storage of a high-altitude airship 200 and launching apparatus (122, 124, 126) in a payload bay. The cargo airship 100 includes a number of internal ballonets 128. The ballonets 128 provide containment of the lifting gas and allow for the distribution of lifting gas to be shifted to achieve more desirable flight characteristics. In this example, a space between the ballonets 128 may be used to store: the high-altitude airship 200 on a reel 126; supplies of lifting gas 124; as well other gear such as command and control equipment 122. The payload bay door 120 is opened to allow the high-altitude airship 200 to be deployed. As discussed below in greater detail, the hull of the high-altitude airship can be inflated from the supplies of lifting gas 124 and/or from the lifting gas in the ballonets 128 of the cargo airship 100. The reel 126 rotates to allow the high-altitude airship 200 to be deployed upward through the payload bay door 120 of the cargo airship 100 as shown in FIG. 1D. FIG. 1E is a side view of a high-altitude airship 200 at altitude with an optional payload 204 suspended from the airship by shroud lines 202. In this implementation, the high-altitude airship 200 includes a "pumpkin lobed" hull balloon intended for operation in the upper stratosphere.

Figure 2A:
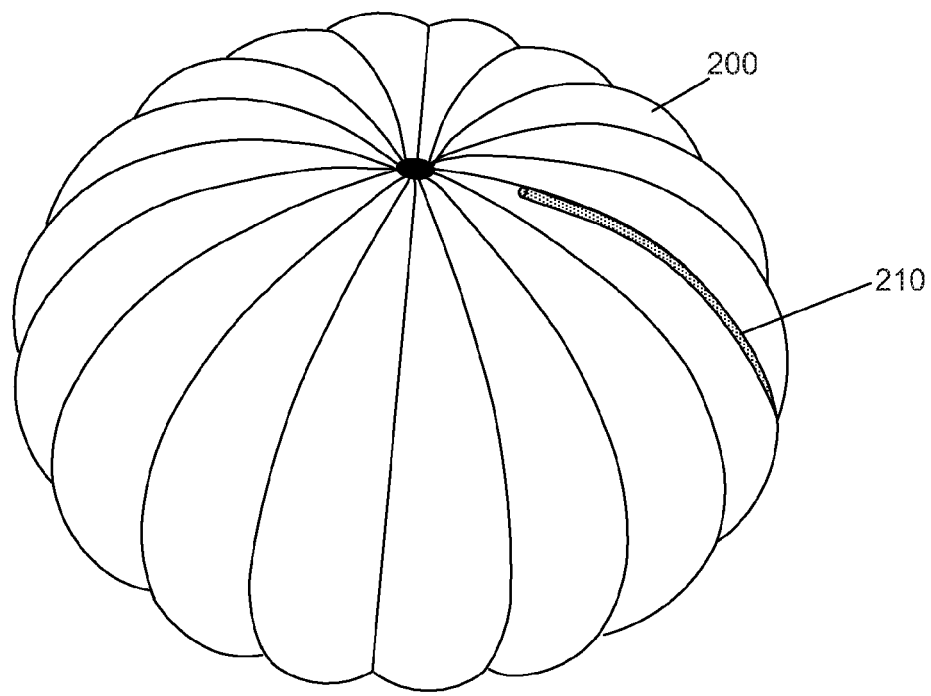
FIGS. 2A and 2B are diagrams of an illustrative high-altitude airship with an illustrative inflation tube, according to one example of principles described herein.
Figure 2B:
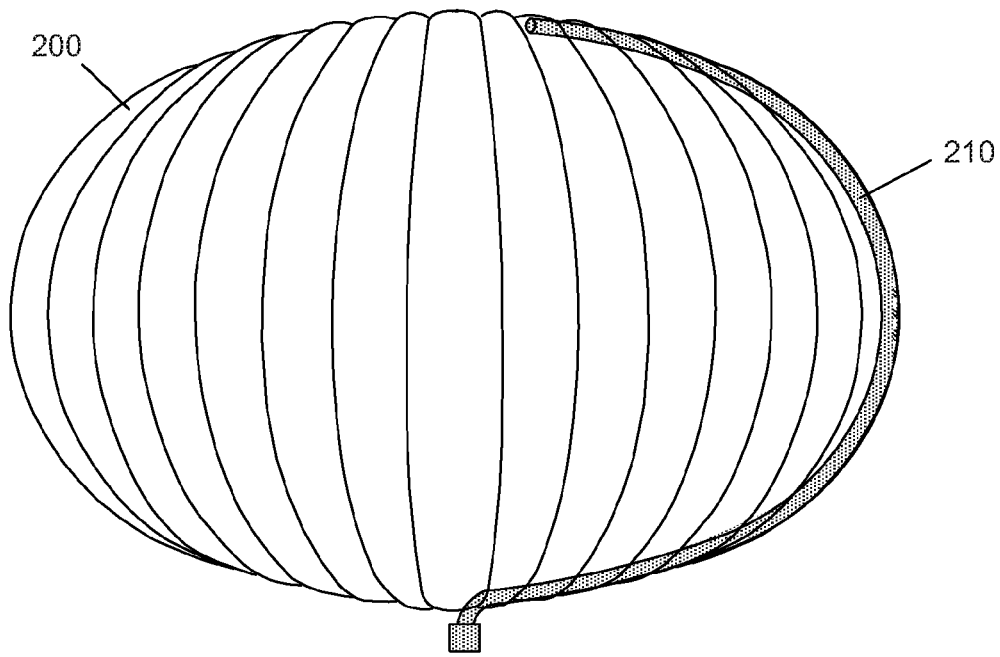

FIGS. 2A and 2B illustrate the general outline of one type of high-altitude airship 200 that can be deployed using the inventive concepts disclosed herein. As shown in FIGS. 2A and 2B, an inflation tube 210 runs from a point near the crown of the airship to a point near the base or collar of the airship. Only a portion of the tube is shown in FIG. 2A.

In FIG. 2B the airship 200 has been illustrated as transparent to show the full length of the tube 210. The inflation tube 210 allows lifting gas to be selectively introduced into the crown of the airship during initial inflation of the airship. By inflating the crown of the airship first, the airship deployment proceeds smoothly and allows the reel to continuously unroll the high-altitude airship as the crown of the airship rises out of the payload bay 120, FIG. 1D. If the high-altitude airship 200 is constructed along the lines of a pumpkin-lobed balloon as shown in FIGS. 2A and 2B, the inflation tube 210 may be integrated with one of the seams between gores of the balloon. However, other integration methods could be used, including supporting the inflation tube 210 from the crown of the airship so that the tube hangs down the center of the airship when the airship 200 is inflated. The purpose of the inflation tube 210 is to allow hydrogen gas to be introduced in such a way that the crown of the airship is the first portion to be significantly inflated, as opposed to its base (more generally, the purpose of the inflation tube is to first inflate the part of the high-altitude airship or balloon that is outermost on the drum or spindle 250, and which will be deployed first).

Figure 3A:
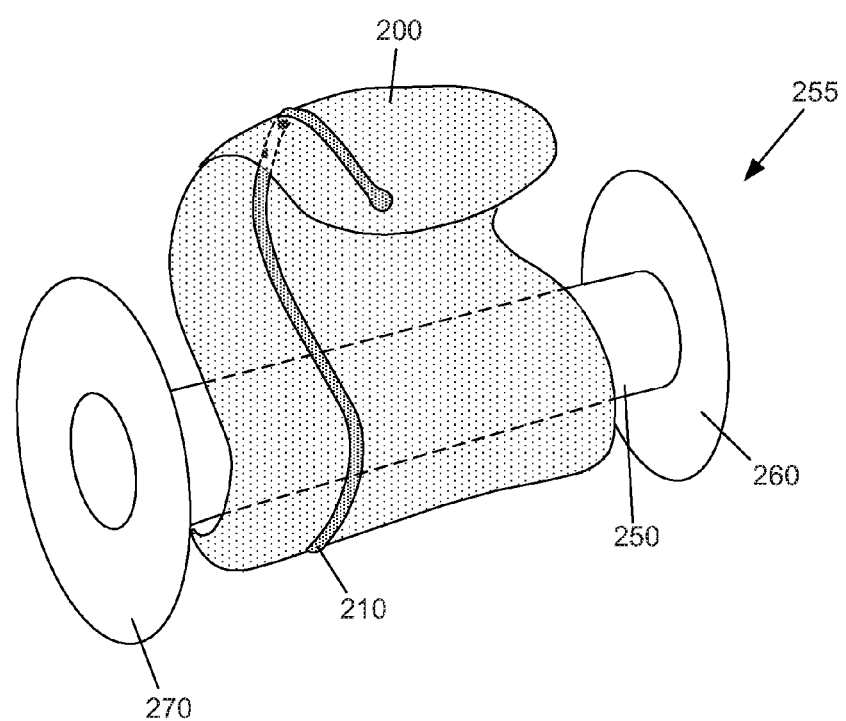
FIG. 3A-3C show a storage concept for a high-altitude airship carried within a payload bay of a cargo airship, according to one example of principles described herein.

FIG. 3A illustrates a general stowage concept for a high-altitude airship carried within the payload bay of the cargo airship 100 (or 110), in accordance with one embodiment of the present invention. This particular embodiment is adapted to the form of the airship 200 illustrated in FIG. 1A-1D, but may be used for certain other airship types and geometries as well. As illustrated in FIG. 3A, the hull comprising the envelope of the lifting volume of the high-altitude balloon or airship 200 is wound loosely on a reel 255. In this example, the reel 255 includes a spindle 250 between end plates 260 and 270. The reel 255 may be supported by additional equipment that is not shown and may include a variety of additional components including motors, brakes, and sensors.

The inflation tube 210 is constructed to resist crushing so that it maintains an open cross-section along its entire length when subjected to the expected compression loads associated with the hull of the high-altitude airship 200 (along with the inflation tube 210 itself) being wound on the reel 255. As the airship 200 is wound onto the reel 255, tension in the direction of winding is carefully managed to insure that compressive forces do not crush the inflation tube 210.

The inflation tube 210 is connected, through the action of a commandable valve that is part of the balloon 200, and a reversible mating apparatus, to a filling port on the reel 255. The filling port, in turn, is fluidically connected to an external supply of lifting gas. One or more of these connections includes a rotating joint (such as a slip ring joint) that allows a first half of the connector to rotate with the reel 255. The other portion of the connector is connected to the external gas supply and remains stationary.

The inflation tube 210 may include one or more diffusers on its terminal end to ensure that hydrogen gas is distributed into the crown of the balloon without damage to the balloon material by the temperature or pressure of the hydrogen. For example, if the hydrogen is taken from cryogenic storage, the hydrogen may be very cold. The diffuser allows the hydrogen to be more effectively distributed and warmed. The diffuser may include an end cap with multiple openings, multiple openings along the length of the tube, or other appropriate configuration. The diffuser may allow the hydrogen to be delivered at higher pressures for more rapid inflation of the balloon. Further, if the tube is used to extract gas from the balloon, the diffuser provides multiple openings that are less likely to be blocked.

In operation, the apparatus and structures illustrated generally in FIG. 3A allows the high-altitude airship 200 to be filled with lifting gas even while it is being unspooled from the drum or spindle 250. Specifically, after the cargo airship 100 (or 110) reaches a desired deployment and launch altitude, and is allowed to drift with the wind so that it achieves close to zero airspeed, the payload bay door or flap 120 is opened or retracted, exposing the payload bay with its high-altitude airship 200 wound on the reel 255. A small amount of lifting gas is introduced into the high-altitude airship 200 by way of the previously-noted plumbing contained in the drum or spindle 250, the filling port, the reversible mating apparatus, the commandable valve, and the inflation tube 210. This causes the crown of the high-altitude airship (or other portion that is wound outermost on the drum or spindle 250) to inflate, become buoyant, and start to pull upward and away from the reel 255. This will naturally tend to cause the drum or spindle 250 to unwind. Additional lifting gas can be introduced as already described, taking care to avoid an excessive inflation rate that could cause the hull of the high-altitude airship to rupture. A motor and brake apparatus, associated with the reel 255 is included in some embodiments to enhance the deployment sequence by assisting in initial deployment (through motorized turning of the drum or spindle) and also slowing the rate of deployment (braking, if necessary).

As illustrated in FIG. 3A, even in its "stowed" or "wound" configuration, a small portion of the high-altitude airship may remain essentially "unwound" on the drum or spindle 250, so as to facilitate initial inflation and the creation of a suitable "bubble of gas" that will achieve positive buoyancy (so that it floats upward and away from the drum or spindle 250).

As the high-altitude airship 200 is unwound from the drum or spindle 250, and inflated with lifting gas, the combined system of the cargo airship 100 (or 110) and high-altitude airship 200 becomes more buoyant (i.e., since the total mass is the same but the total lifting volume filled with lifting gas is increased), and so it tends to seek a higher altitude. The local wind field may change for this and other reasons, but the combined system tends to drift with the lateral wind (although there is a lag in responding to changes in the wind field) and airspeed tends to remain low. This has the effect of protecting the high-altitude airship 200 from damage due to high winds during deployment. If necessary, the cargo airship 100 (or 110) can be operated (maneuvered) to actively follow the winds, using its maneuvering and propulsion capability to overcome its own inertia and thereby help to minimize the local airspeed experienced by the high-altitude airship 200 during its deployment. Furthermore, in some embodiments, the cargo airship 100 (or 110) can actively control its own buoyancy, for example by venting lifting gas or pumping lifting gas into a reservoir (thereby allowing its lifting volume to be reduced). Alternatively, propulsive forces (such as propellers or fans adapted to provide a downward force) can be utilized to counteract the increase in buoyancy. In such embodiments, the altitude of the combined system can be held relatively constant during the deployment sequence.

The amount of lifting gas introduced into the high-altitude airship can be metered to ensure that a proper amount of lifting gas is introduced to take the airship to its desired altitude, while guarding against over inflation. When the proper amount of lifting gas has been introduced, and the high-altitude airship is fully unspooled from the drum or spindle 250, the commendable valve is closed and the reversible mating apparatus is operated to demate the airship 200 from the mating fixture of the drum or spindle 250. The high-altitude airship then ascends from the cargo airship 100 (or 110), while the cargo airship 100 (or 110) itself descends to a lower altitude.

Figure 3B:
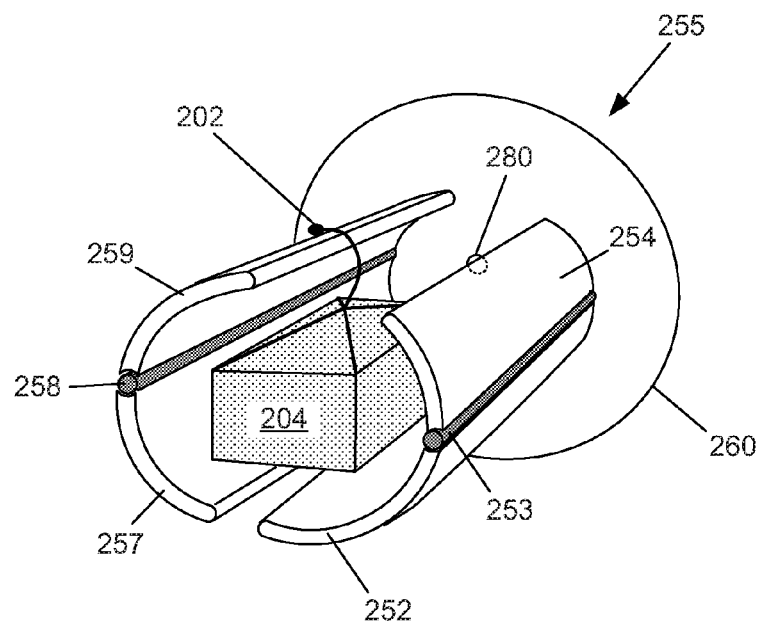
Figure 3C:
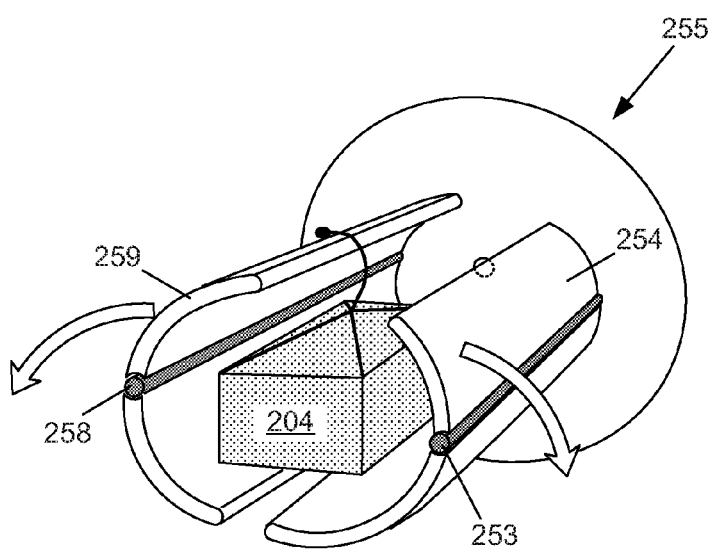

If the high-altitude airship 200 is associated with a payload, perhaps connected to the airship with shrouds so that it will be suspended below the airship during normal operation, the apparatus of FIG. 3A can be modified or adapted as illustrated in FIGS. 3B and 3C. Here, end plate 270 has been removed from the illustration for clarity (although it is present in the intended apparatus) and drum or spindle 250 has been replaced with fixed cylindrical segments 252 and 257 and movable cylindrical segments 254 and 259. The movable segments 254 and 259 are connected to the fixed segments 252 and 257 through hinge lines 253 and 258, and can open outward under the influence of remotely commendable latches, springs, or other actuators known to those of skill in the art. The payload 204 is secured to the fixed cylindrical segments 252 and 257, and held within the generally cylindrical space as illustrated, by remotely commendable, reversibly latchable mounting apparatus that is also known to those of skill in the art, and is not explicitly shown. Shroud lines 202 are illustrated schematically as extending from the payload 204 and wrapping around the fixed and movable cylindrical segments already described. Numerous turns of the shroud lines 202 on the cylindrical segments could exist, followed by the high-altitude airship itself. As noted previously, the high-altitude airship 200 comprises an inflation tube 210, commendable valve, and reversible mating apparatus which in this embodiment is connected to a filling port 280 located axially on the end plate 260. A variety of additional components may also be included. For example, a short tube may be used to span the distance from the airship hull itself, which may be outside the generally cylindrical space bounded by the cylindrical segments 252, 254, 257 and 259, and the reversible mating apparatus connected to the filling port 280.

In operation, the high-altitude airship 200 is unwound from the apparatus illustrated in FIGS. 3A-C. However, the unwinding activity is paused when the high-altitude airship 200 is clear of the apparatus. The commendable valve is then closed. Optionally, a hull integrity check can be performed at this stage and, if a breach in the hull is detected, the high-altitude airship can be vented of its lifting gas and rewound on the illustrated apparatus, and returned to the ground for repair (alternatively, if it is infeasible to re-stow the airship, it can be jettisoned and only the payload can be returned to the ground). If no fault is detected, the reversible mating apparatus is operated to demate from the filling port 280. The unwinding activity is then continued, until the shroud lines are fully extended. At this stage, the rotation of the apparatus is again halted. The movable segments 254 and 259 are commanded open and pivot on hinge lines 253 and 258, respectively, as shown in FIG. 3C. The remotely commendable latches holding the payload 204 in place are then commanded open, releasing the payload 204 and the entire high-altitude airship 200 from the cargo airship 100 (or 110).

Other Embodiments

Figure 4:
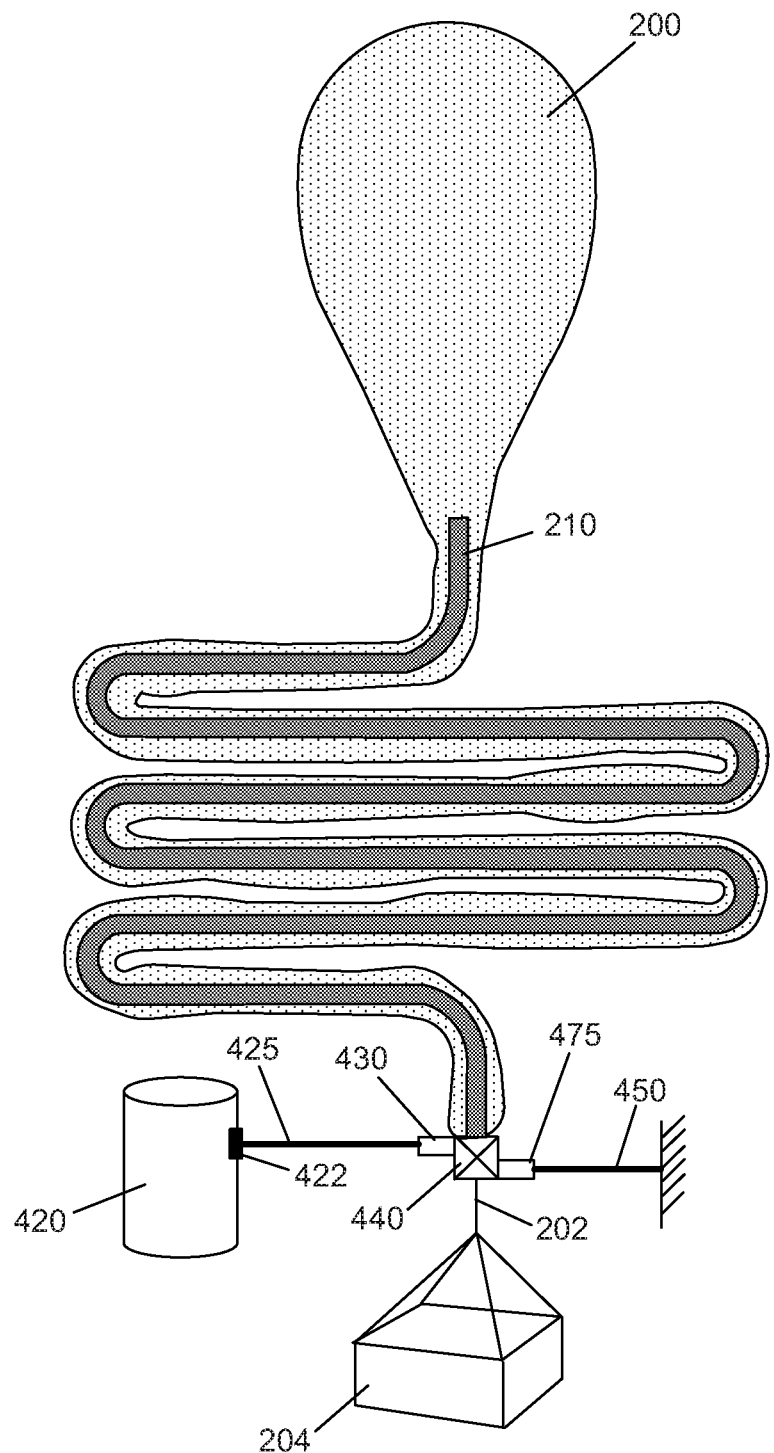
FIG. 4 is a diagram deployment of a high-altitude airship that has been folded in a payload bay of a cargo airship, according to one example of principles described herein.

In another embodiment, instead of a rotatable reel, the high-altitude airship is folded and stowed in an accordion fashion within the payload bay of the cargo airship. FIG. 4 illustrates a partially-filled high-altitude airship at an early point in the deployment process associated with such an embodiment. The high-altitude airship 200 is shown partially folded and partially inflated. The figure illustrates a reservoir of lifting gas 420, a remotely operable valve 422, and a gas line 425 fluidically connecting the valve 422 to a remotely operable mating apparatus 430 which is mated to a gas fill port on the collar 440 of the high-altitude airship 200. The collar 440, in turn, comprises a second remotely operable valve (not shown) connecting the gas fill port to the inflation tube 210, which was previously discussed. Also shown is a bracket 450 and remotely operable latch 475 which holds the collar of the high-altitude airship in place until the latch 475 is released. The payload 204 is attached to the collar 440 by shroud lines 202. In operation, the remotely operable valves are operated to fill the airship with a suitable amount of lifting gas from the reservoir 420. The high-altitude airship inflates and extracts (or substantially extracts) itself from the cargo bay. The remotely operable valves are closed and an optional hull integrity check is performed. The remotely operable mating apparatus 430 is operated to demate from the collar of the high-altitude airship, and the remotely operable latch 475 is operated to release the high-altitude airship 200 along with its payload 204.

In another embodiment, the high-altitude airship is secured to the top of the cargo airship rather than being stowed internally within a payload bay. In this embodiment, if the high-altitude airship is associated with a payload, the payload may be stored in a payload bay, or it also may be secured externally to the cargo airship, and released when required.

Deployment of a Tethered Airship System

In the implementation described below, the numerical examples are approximate and intended to illustrate general principles of the inventive concept as opposed to a precise design. Further, a number of simplifying assumptions, such as ignoring temperature differences, are used in the illustrative calculations.

Consider a tethered airship system in accordance with U.S. application Ser. No. 13/159,215 comprising a lower airship, an upper airship and a tether connecting the two airships. In one embodiment of the present invention, the upper airship and tether is initially launched from the ground, and carried as a payload of the lower airship. As one example of the principles described herein, assume that the lower airship weighs ~5000 kg, is designed to operate in a altitude range of 18 to 19 km, and comprises a maximum lifting volume of 44,700 m$^3$ in one or several ballonets that can withstand a maximum pressure difference of 2 kPa (i.e., they can be deflated, or partially inflated, or fully inflated to ambient pressure, or fully inflated to a pressure up to 2 kPa above ambient pressure). Assume the upper airship weighs ~2150 kg, is designed to operate in an altitude range of 27 to 37 km, and comprises a maximum lifting volume of 500,000 m$^3$ in a balloon that can be inflated to a maximum pressure difference of 100 Pa relative to ambient pressure. Assume that the tether weighs 600 kg.

Initially, the total weight of all systems is 7750 kg and the lower airship, considering its maximum lifting volume, can carry this total weight to an altitude in excess of 15 km. At this altitude, atmospheric density is about 0.193 kg/m$^3$ and the density of an equivalent volume of hydrogen is about 0.0015 kg/m$^3$. If this is rounded up to 0.002 kg/m$^3$, the reader will appreciate that the lifting capacity of the lower airship will be about 0.191 kg/m$^3$ and only 44,000 m$^3$ of lifting volume would be sufficient to carry 8400 kg (650 kg more than the total system weight) to 15 km. Hence the lower airship can carry the total system to 15 km with some design margin (i.e., the ballonets do not require full inflation at 15 km altitude in order to carry the total system weight).

With the system as described, the total system is in buoyant equilibrium at about 15 km altitude with most or all of the lifting volume of the lower airship operated at ambient pressure (i.e., some or all of the ballonets may be only partially inflated, and pressurized sections of the hull intended to maintain a rigid aerodynamic shape have been ignored for this illustrative calculation). The lifting gas, which is at ambient pressure, could be transferred from one ballonet to another within the lower airship without affecting total system buoyancy. Similarly, some of the lifting gas could be transferred at atmospheric pressure from the ballonets of the lower airship, to the upper airship, without affecting total system buoyancy. Hence, the upper airship could be filled with a sufficient quantity of lifting gas to carry the upper airship and the full weight of the tether to the maximum design altitude of 37 km, where the upper airship would be fully inflated and would experience at internal pressure roughly 100 Pa above ambient. However, prior to release, the upper airship and lower airship are both at the pre-existing equilibrium altitude since the total lifting volume has not changed (it has only been shifted from one part of the system to another). The volume of gas, at ambient pressure at 15 km, required to carry the upper airship plus tether to altitude is roughly $$(2150+600)/0.191 \approx 14{,}400 \text{ m}^3,$$

or roughly one-third of the original lifting volume of the lower airship. If carried to an altitude of 37 km, and allowed to expand to match atmospheric pressure at that altitude (420 Pa), this volume of lifting gas would expand to roughly 415,000 m$^3$. If instead, a volume of approximately 21,600 m$^3$ of lifting gas is transferred (at 15 km where pressure is nominally 12,045 Pa), the upper airship could be operated at 37 km at its full volume of 500,000 m$^3$ and full internal pressure of 520 Pa (i.e., 100 Pa above ambient).

After a transfer of 21,600 m$^3$, the lower airship has an effective lifting volume of roughly 22,400 m$^3$ or less, considering that it started with less than 44,000 m$^3$. Hence, its lifting capacity is no more than (22,400 m$^3$)*(0.191 kg/m$^3$)≈4300 kg. This is less than the weight of the lower airship (5000 kg). If the upper airship is released and allowed to ascend to 37 km altitude, it will provide a buoyancy force of (500,000 m$^3$)*(0.0055 kg/m$^3$)=2750 kg; roughly the weight of the upper airship plus the tether. So the total lifting force is no greater than 6950 kg, which is less than the total system weight (7800 kg). Hence, the lower airship will not be able to maintain its altitude as the upper airship ascends—additional lifting gas must be added to the lower airship in order to increase buoyancy, and actually achieve the intended operational altitude of about 18 km. In order for the lower airship to carry its own weight ignoring the tether, at an altitude of 18 km where atmospheric density is 0.1207 kg/m$^3$ and atmospheric pressure is 7,505 Pa, and the lifting capacity of hydrogen is roughly (13/14)*0.1207~0.112 kg/m$^3$, the lower airship must attain a lifting volume of roughly 44,600 m$^3$. This same amount of lifting gas, at the initial deployment altitude of 15 km where atmospheric pressure=12045 Pa, comprises a volume of roughly (44,600 m$^3$)*7505/12045~27,800 m$^3$. Hence, adding to the remaining complement of the lower airship (roughly 22,400 m$^3$ of lifting gas after the inflation of the upper airship), roughly 5400 m$^3$ of hydrogen gas must be added at the ambient atmospheric pressure of 12045 Pa. This can be added from an internal reservoir carried by the lower airship (cryogenic, non-cryogenic, or chemical), or an external tanker/logistics airship adapted to provide additional lifting gas.

In the example just described, some of the need for additional lifting gas could be alleviated by utilizing the full lifting volume of the lower airship. It may also be feasible, for some embodiments, to tailor the initial operation of the lower airship so that it experiences a positive pressure differential (inside pressure compared to outside) at equilibrium altitude prior to the transfer of lifting gas to the upper airship. This would leave the lower airship with a slightly greater volume of lifting gas following the transfer of gas to the upper airship, thereby minimizing the need for replenishment gas from an internal reservoir or external tanker/logistics airship. However, care must be taken when performing such an operation since the tendency, upon initiating the transfer of gas, will be for the total system to rise slightly in altitude (i.e., since the lifting volume of the upper airship increases, but the lifting volume of the lower airship remains unchanged since its lifting volume is initially pressurized relative to ambient pressure). Thus, care must be taken to ensure that the design parameters of the lower airship (specifically, maximum pressure differential) are not exceeded in any of its ballonets or its lifting volume as a whole.

In one embodiment, the lower airship is augmented with a cryogenic reservoir of lifting gas (which increases its weight), loaded with the upper airship and its associated deployment apparatus, and inflated to achieve neutral buoyancy at full ballonet inflation, but without overpressure, at an altitude below its intended operating altitude. Following the transfer of lifting gas to the upper airship, and deployment of the upper airship to a higher altitude, the lower airship replenishes its lifting volume with lifting gas from the cryogenic reservoir. The cryogenic reservoir may be retained on the lower airship for the life of the mission, or it may be jettisoned in a safe area where it will not pose a risk to life or property on the ground (e.g., an oceanic area).

If a reservoir of lifting gas is available during gas transfer to, and inflation of, the upper airship, or equivalently if a tanker/logistics airship is available during this process, there could also be a transfer directly from the reservoir (or tanker/logistics airship) to the upper airship, for at least some of the required lifting gas, thereby avoiding the need to deplete and subsequently replenish the lower airship.

The upper airship of a tethered airship system may comprise multiple elements such as a buoyant element (such as a high-altitude balloon) at the high end of a tether, a parafoil, a parachute, and a docking element for a shuttle designed to move up and down the tether, with the parafoil, parachute, and docking element attached (and controlled from, as necessary) subsystems spaced apart along the tether. The tethered airship system may also comprise elements such as the aforementioned shuttle that moves up and down the tether, and elements associated with the lower airship such as tether attachment/deployment mechanisms and sheaths designed to protect other elements of the system from abrasion and wear. In some embodiments, all of these elements may be "stacked" in accordion fashion prior to deployment, in a generalization of the stowage concept illustrated in FIG. 4. In other embodiments, the upper airship, its associated parafoil, parachute, docking elements (and their attachment and control apparatus) and a portion of the tether are stowed on a rotatable spool as indicated generally in FIG. 3. As part of the deployment sequence, the lower end of the tether deployed from said rotatable spool is transferred and attached to the end of another segment of tether which is associated with the rest of the system. In still other embodiments, the rotatable spool used for stowing and deploying the upper airship and its associated elements is integrated with the "high-altitude" docking element for the shuttle (this docking element being the lower-most mechanical element associated with the upper airship). The docking element is in turn attached to the end of another segment of tether which is associated with the rest of the system. All attachments are made on the ground and verified prior to launch. This embodiment has the disadvantage of carrying unnecessary weight to altitude (e.g., the rotatable spool), but avoids the engineering challenge and mission risk of making and ensuring a secure attachment between two elements during the deployment sequence.

Figure 5:
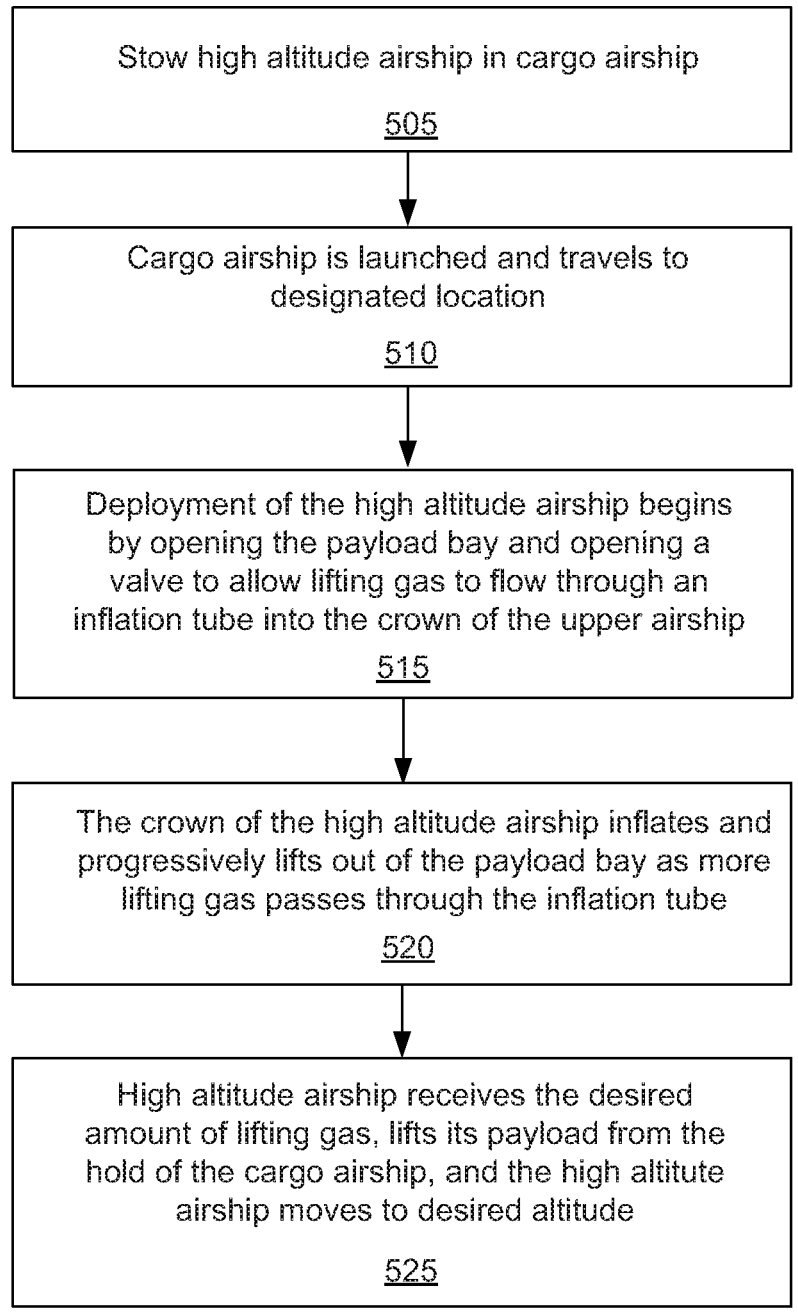
FIG. 5 is a flow chart of an illustrative method for deploying a high-altitude airship from a cargo airship, according to one example of principles described herein.

The specific details described above are illustrative examples. The principles described herein are not limited to the examples disclosed. The principles could be used with a wide range of airships and in a wide variety of configurations. In general, a method for launch of an airship includes connecting a cargo airship to a deflated second airship and launching the cargo airship. The cargo airship carries the second airship aloft and inflates the second airship lifting gas carried by the cargo airship. The second airship is then released from the cargo airship. FIGS. 5 and 6 are flowcharts that describe illustrative methods for launching airships from a cargo airship.

FIG. 5 is a flow chart of an illustrative method 500 for deploying a high-altitude airship from a cargo airship. The upper airship is stowed in the cargo airship (block 505). The cargo airship is launched and travels to a designated location (block 510). Deployment of the upper airship begins by opening the payload bay and opening a valve to allow lifting gas to flow through an inflation tube into the crown of the upper airship (block 515). The crown of the upper airship inflates and progressively lifts out of the payload bay as more lifting gas passes through the inflation tube (block 520). The upper airship receives the desired amount of lifting gas, lifts its payload from the payload bay of the cargo airship, and ascends to the desired altitude (block 525).

The method described above is only one illustrative example and could be altered in a variety of ways. The blocks could be deleted, added, combined or reordered. For example, additional blocks could be added to describe shutting the valve after the desired amount of lifting gas has been received by the high-altitude airship or opening a reel to release the payload from the payload bay.

Figure 6A:
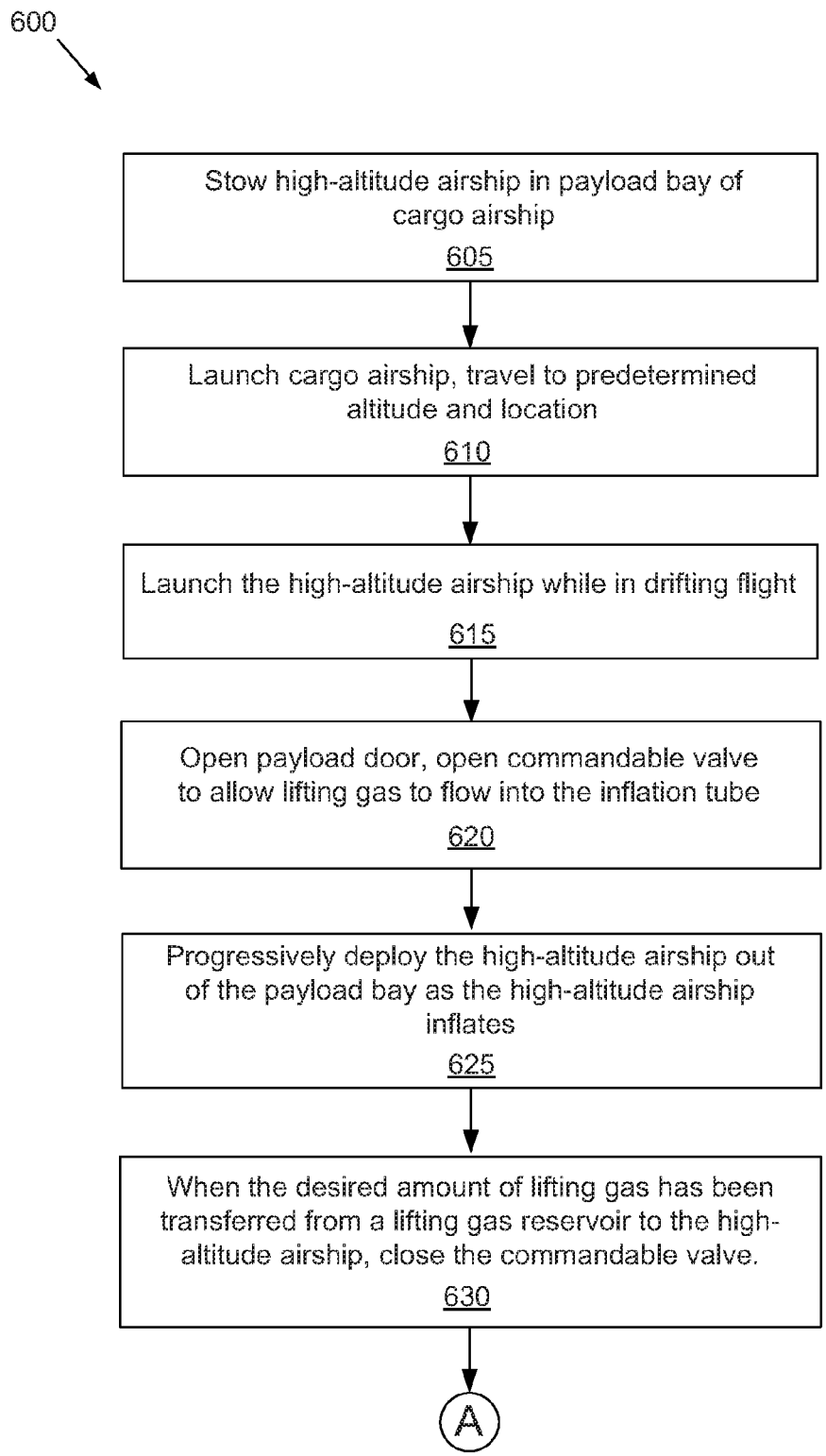
FIGS. 6A-6B show a flow chart of an illustrative method for deploying a high-altitude airship from a cargo airship, according to one example of principles described herein.
Figure 6B:
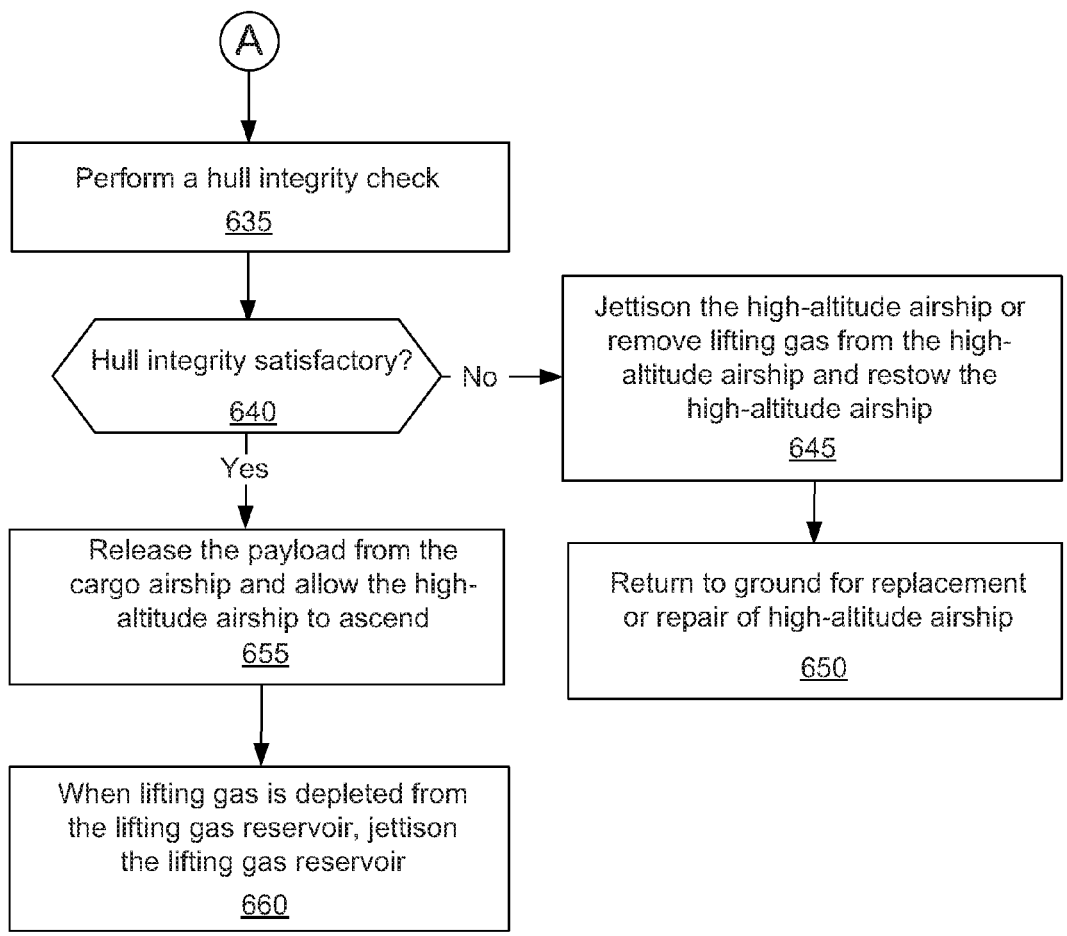

FIGS. 6A and 6B show a more detailed method 600 for deploying a high-altitude airship from a cargo airship. In this example, the high-altitude airship and its payload (if any) are stowed in a payload bay of the cargo airship (block 605). As discussed above, the hull of the high-altitude airship may be stowed in a variety of configurations, including wrapped around a reel or a number of folded configurations. The payload and other items, such as parachutes, tethers, parafoils, and other items, can be appropriately attached to the hull and stowed for deployment out of the payload door in an upper surface of the cargo ship. The high-altitude airship includes a tube that passes from a source of lifting gas through the length of the uninflated hull to the crown of the hull.

The cargo airship is launched and travels to a predetermined altitude and location (block 610). In some embodiments, the cargo airship may use a combination of buoyant lift, vectored thrust, aerodynamic lift, and pressure control of ballonets to maintain the desired heading, altitude, and velocity. For example, if the total mass of the cargo airship and its payload exceeds the buoyant lifting capacity of the cargo airship, the cargo airship could use vectored thrust and aerodynamic lift to increase its lifting capacity. The vectored thrust could be generated in a variety ways, including the use of directional ducted fans. Aerodynamic lift can be created through the geometry and/or angle of attack of the airship and lifting surfaces attached to the airship.

The cargo ship then transitions into drifting flight while launching the high-altitude airship (block 615). Drifting flight can include a variety of maneuvers and propulsion schemes that minimize the speed of winds on the upper airship below a predetermined threshold as it is being inflated and launched. For example, drifting flight may include controlling the cargo ship so that it travels approximately the same speed and direction as the surrounding air. Drifting flight may also include using propulsion to alter the speed or orientation of the cargo airship to maintain the desired heading. In some circumstances, drifting flight may include slight differences between the speed of the cargo airship and the surrounding air. These slight differences may be used to apply desirable aerodynamic forces on high-altitude airships.

The launch of the high-altitude airship includes opening a payload door in the upper surface of the cargo airship and opening a commendable valve to allow lifting gas to flow through the inflation tube into the crown of the high-altitude airship hull (block 620). As the hull inflates the high-altitude airship is progressively deployed out of the payload bay (block 625). When the desired amount of lifting gas has been transferred from a lifting gas reservoir to the upper airship, the commendable valve is closed (block 630).

Continuing in FIG. 6B, a hull integrity check is performed (block 635). The hull integrity check may include a variety of sensors and techniques designed to determine if a hole or a rip in the hull is allowing lifting gas to escape. The hull integrity check may include sensing pressure changes in the hull, imaging the interior or exterior of the hull, detecting a change in the lifting capacity of the high-altitude airship, or other appropriate technique.

An evaluation of the hull integrity is then made (block 640). If the evaluation indicates that the hull integrity is not satisfactory, the high-altitude airship can be jettisoned or the lifting gas can be removed and the high-altitude airship restowed in the payload bay (block 645). Jettisoning the high-altitude airship may include actions such as firing a pyrotechnic cutter to cut the shroud lines that attach the hull of the airship to the payload. The hull and the lifting gas remaining inside the hull then rise rapidly away from the cargo airship. Restowing the high-altitude airship allows the airship to be returned to the ground for repair or replacement. The lifting gas can be removed using a variety of techniques, including venting the lifting gas and/or pumping the lifting gas out of the hull. Lifting gas that is pumped out of the hull can be stored in pressure tanks or returned to ballonets in the cargo ship. After the damaged hull of the upper airship has been jettisoned or restowed, the cargo airship can return to the ground for replacement or repair of the high-altitude airship (block 650).

If the hull integrity is determined to be satisfactory ("Yes") the payload can be released from the cargo airship to allow the upper airship to ascend (block 655). The high-altitude airship may be free flying or may be connected to the cargo airship by a tether. After deployment of the high-altitude airship, there may be one or more lifting gas reservoirs that are empty. These depleted lifting gas reservoirs can be jettisoned to improve the endurance and buoyancy of the cargo airship (block 660).

In sum, a two stage deployment concept that includes a robust cargo airship that can carry a high-altitude airship as a payload, travel to a desired deployment location and deploy the high-altitude airship at a suitable altitude. This enables direct insertion into difficult environments such as polar or mid-oceanic areas. By deploying the upper airship while the cargo airship is in drifting flight, winds can be minimized. This allows for easier launch and lower damage risk to the upper airship. The cargo airship can be launched in a wide variety of wind conditions and sites. This greatly increases the available launch windows for upper airships.

Figure 7:
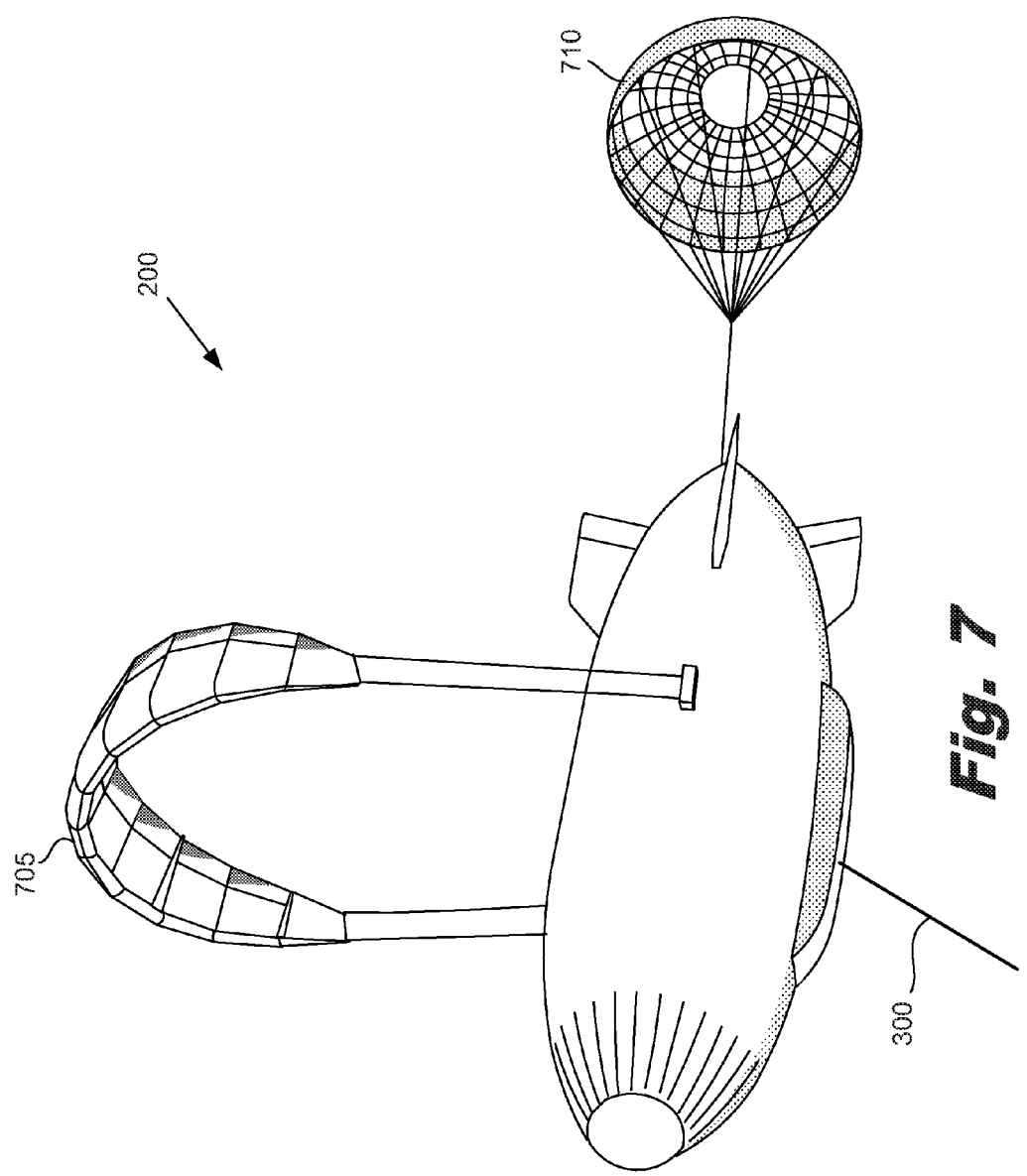
FIG. 7 is perspective view of an airship equipped with a parafoil and a parachute, according to one example of principles described herein.

FIG. 7 is a perspective view of an upper airship 200 which has deployed both a parafoil 705 and a parachute 710 to more effectively utilize the differences in wind speeds for station keeping. For example, the parachute 710 may be used to increase the drag of the upper airship 200 to compensate for stronger winds experienced by the lower airship. The parafoil 705 may be used to produce lift to increase tension in the tether 300 and/or lift the upper airship 200 to a higher altitude. Each of the aerodynamic elements 705, 710 can be controlled to produce the desired dynamic lift and/or drag within the constraints of the system. While this illustration shows the upper airship as a dirigible shape with horizontal and vertical stabilizers and control surfaces, other designs are possible as discussed below. Dirigible shapes are frequently considered for operation in the troposphere and lower stratosphere, and could be used for both the upper and lower airship of a tethered pair designed to operate in the altitude range of 10-20 km altitude. However, at higher operational altitudes, such as 30-40 km, other designs, such as those illustrated in FIGS. 8 and 9, will tend to be preferred.

In one embodiment contemplated herein, the parafoil 705 contains bladders inflated with hydrogen to ensure that it flies at a higher altitude than the upper airship 200 itself, even when there is no wind, and to also ensure that the parafoil inflates correctly in high wind conditions. In another embodiment, the parafoil 705 contains bladders inflated with hydrogen or another gas to ensure proper inflation in low wind, but has insufficient buoyancy to lift itself off the upper airship 200 in the absence of an ambient wind. The parafoil angle of attack and heading can be controlled via shrouds and control lines connecting the parafoil to the upper airship via suitable control line actuators to control line length and tension, allowing for controllable variation in lift and drag as well as allowing for some cross-wind propulsion. Furthermore, in some embodiments, the control lines can be reversibly "reeled in" to stow the parafoil against the surface of the airship and thereby minimize both lift and drag.

The lower airship can also be equipped with a parafoil. If it is desired to equip the lower airship with a parafoil designed for negative dynamic lift, the parafoil would fly below the lower airship but would still be controlled via shrouds and control lines connecting the parafoil to the lower airship via suitable control line actuators to control line length and tension. In one embodiment herein, a parafoil intended to provide negative dynamic lift contains bladders filled with carbon dioxide or an alternative heavier-than-air gas to ensure that it flies at a lower altitude than the lower airship itself, and that it inflates correctly in high wind conditions.

A parafoil provides both dynamic lift (positive or negative) and also increased drag. If increased drag is required, with or without a parafoil, a parachute or equivalent drag enhancement device can be used. For a particular wind speed (airspeed) and at full deployment, a given parachute will have a characteristic maximum drag. However, various methods known in the art can be used to reduce the drag provided by a given parachute in a given wind condition, thereby modulating the drag to match requirements. For example, the size of the aperture can be reduced by constricting a control line running around the circumference of the aperture. Additional control lines can be spaced at parallel planes throughout the parachute to control the amount of fluttering material in the non-fully-inflated parachute. Alternatively, selected panels of the parachute can be opened to allow free (or more free) passage of air.

If drag forces experienced by the upper and lower airship are equal in magnitude but opposite in direction, at (or near) zero ground speed, stationkeeping propulsion requirements will be minimized. For airships of similar geometry, material composition, and heading with respect to the wind, drag forces are proportional to air density and airship surface area, and are also proportional to the square of airspeed. The drag force may be calculated as $$F_d = \tfrac{1}{2} \rho v^2 A C_d$$

where $\rho$ is air density, v is airspeed, A is the reference area and $C_d$ is the coefficient of drag. Air density varies by roughly an order of magnitude between the lower stratosphere (near 20 km altitude) and the upper stratosphere (near 40 km altitude), being lower at higher altitudes, and wind speed can vary as well. Wind speed tends to be lower in the lower stratosphere than the upper stratosphere. The tendency of wind speeds in the upper stratosphere to be higher than wind speeds in the lower stratosphere compensates to some degree for the reduced air density at higher altitudes; however, wind speed experienced by each airship, and the resulting drag forces, can vary from hour to hour. As a consequence, a variety of techniques may be used to equalize (or approximately equalize) drag forces between a lower airship and an upper airship. It should be noted that perfect equalization is not required since even partial equalization will reduce stationkeeping propulsion requirements; however, full equalization is a desired goal.

The following methods, among others, can be employed to adjust drag forces on the upper and lower airships:
   Minor adjustments in drag can be achieved through the use of airbrakes and turning maneuvers (e.g., oscillating back and forth across the oncoming wind) on the part of the airship experiencing lower drag;
   The airship experiencing lower drag force can deploy a parachute if it has not already done so, or increase the drag coefficient of a deployed parachute if it is not already maximized;
   The airship experiencing higher drag force can reduce the drag coefficient of a deployed parachute, or stow the parachute completely;
   The angle of attack of deployed parafoils can be adjusted to vary the amount of lift and drag. Also, if so equipped, the airfoil can be enlarged or reduced in size by alternately inflating or deflating selected lifting cells;
   The angle of attack of the airships themselves can be adjusted by use of horizontal control surfaces, or by changing the angle of the tether attachment/deployment subsystem relative to the airship as shown in FIG. 3;
   The length of the tether can be adjusted, in concert with other controllable factors affecting lift and drag, so as to fly the airships at altitudes where the drag forces can be equalized. Adjustments in positive and negative dynamic lift can be used to fly the two airships to higher or lower altitudes, and the length of tether can be used to adjust their altitude separation.

Figure 8:
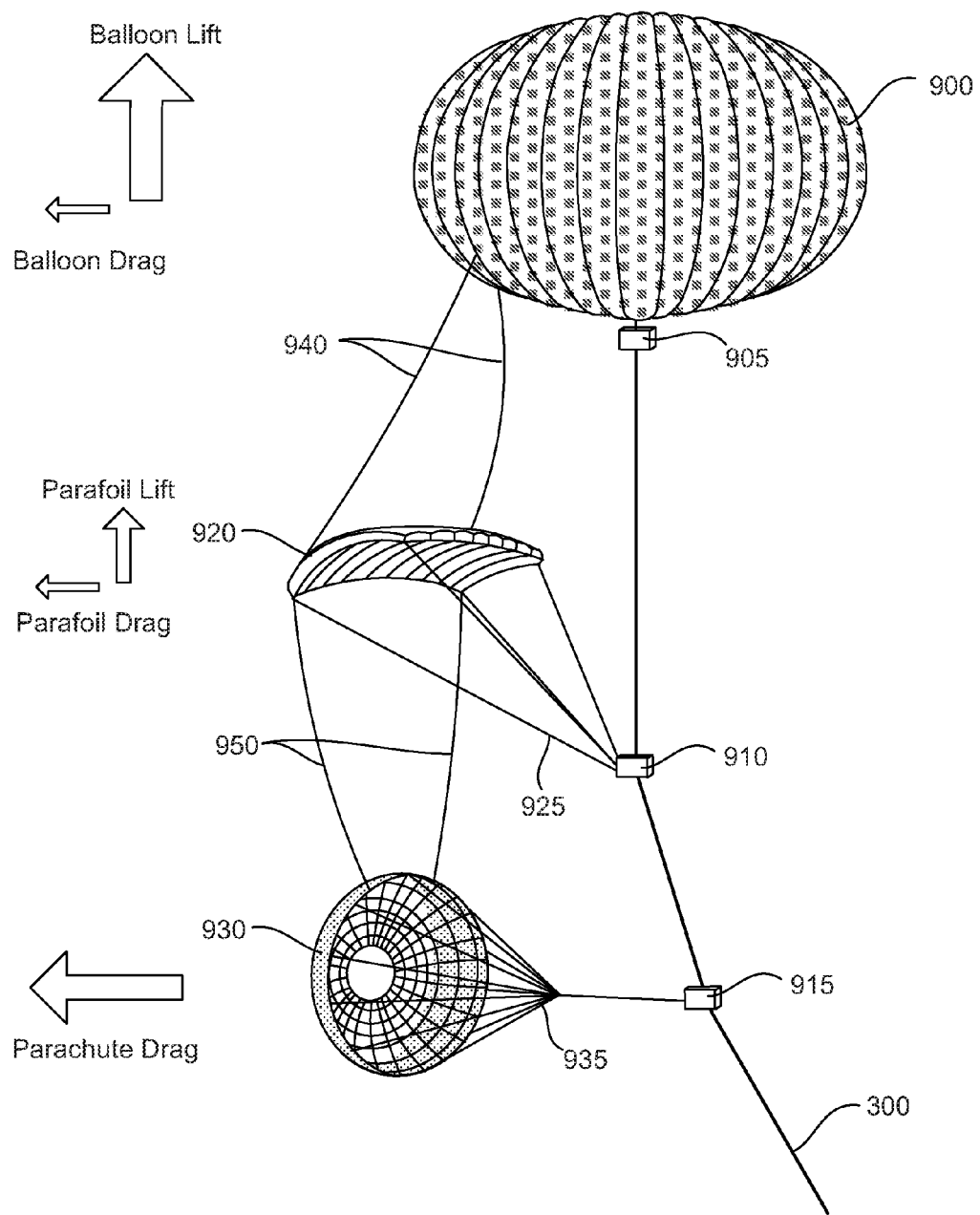
FIG. 8 illustrates a high altitude balloon with controllable aerodynamic elements, according to one example of principles described herein.

Another possible alternative is to use a single larger balloon as illustrated in FIG. 8. Here, the upper airship 900 is a pumpkin-lobed balloon with a tether attachment subsystem 905 which also serves as an equipment and electronics gondola. Solar cells, batteries, power management and distribution equipment, radios, navigation receivers, computers, and the like, are collectively not shown but are present and provide for the power needs of the upper airship and the command and control of its associated systems. In addition to the primary tether attachment subsystem 905, there are two additional equipment packages 910 and 915 illustrated as being spaced apart from one another along the tether 300. Equipment package 910 serves as the anchor for the parafoil 920 and also comprises the control electronics and actuators for the parafoil shroud/control lines 925. The parafoil 920 can thereby be controlled with respect to its angle of attack, L/D ratio, and orientation to allow for lateral lift forces. Equipment package 915 serves as the anchor for the parachute 930. Shroud lines and control lines 935 are not differentiated in this figure, but allow the control electronics and actuators to adjust parachute aperture size, and therefore drag, even while the parachute is operating but firmly anchored to the equipment package 915. Alternatives to this approach include control electronics in the parachute itself, and controllable vents in the parachute to reduce drag (i.e., as an alternative to adjusting aperture size).

If the tether 300 is made up of multiple sections connecting packages 905, 910, and 915 to the lower airship system (not shown), then the equipment packages 910 and 915 are designed to sustain the maximum load anticipated for the system as a whole. This load would be upper bounded by the bursting strength of the tether. Conversely, if the tether is continuous and equipment packages 910, 915 are merely mounted on, or attached to, the tether, the equipment packages could be less robust. However, in this case they are designed to sustain the lift and drag forces associated with the parafoil and parachute.

FIG. 9 also shows suspension lines 940 running from the balloon 900 to the parafoil 920, and additional suspension lines 950 running from the parafoil 920 to the parachute 930. These illustrated lines 940 and 950 should be interpreted as being indicative of a suspension function; additional suspension lines could exist, and the placement of the suspension lines can be adapted to specific designs. However, the purpose of the suspension lines 940, 950 is made evident when considering the zero-wind condition and the need to avoid entanglement between the various elements of the system. Thus, in a zero-wind condition, the parafoil will be suspended from the balloon and will be spaced away from its equipment package 910. Furthermore, it will be in a configuration favoring proper inflation in the wind. No additional bladders of lifting gas are required in the parafoil (although they are not precluded). Similarly, the suspension lines 950 provide support for the parachute, which in a no-wind situation will be spaced-away from its equipment package 915 and be in a configuration favoring proper inflation.

In one example, the lengths of the suspension lines are selected so that, when the parafoil and parachute are inflated, the suspension lines 940 and 950 are substantially slack and do not interfere with the operation of the parafoil and parachute.

The block arrows on the left-hand side of FIG. 9 indicate qualitatively the relative magnitudes of the lift and drag forces generated by the balloon, parafoil and parachute under peak wind loading conditions. The balloon provides the dominant lifting force, since it carries the entire system even in the absence of wind. Surprisingly, for its large size, the drag forces at an altitude of 40 km are generally small even in wind equal to the maximum wind speed encountered by the lower airship. Hence, for the balloon, the lift force is shown as a strong upward arrow and the drag force is shown as a weak (thin) horizontal arrow. The ratio of magnitudes can be 10:1 or 20:1, or even greater. Hence the upper part of the tether, between 905 and 910, will be almost vertical under most operational conditions.

During high winds, the parafoil provides the additional lifting force to ensure that the majority of the tether (the portion extending down to the lower airship) remains relatively vertical. A parafoil can generally achieve a ratio of lift to drag of between 1 and 5, so the parafoil is shown with a drag force that is somewhat weaker than the lift force. The parachute contributes only drag (i.e., in order to help balance the drag experienced by the lower airship).

Illustrative Tethered Airship Example

In one embodiment, both airships are connected by a tether[1] and contain a standard compliment of housekeeping and communications and control equipment (not necessarily identical between the two airships) associated with effective human control. This includes navigation and position determining systems, aerodynamic control systems, telemetry and command communications systems, computational resources and the like.

[1] While the description herein may refer to "a tether" or "the tether", it should be understood that the tether could comprise several lengths connected end-to-end, possibly with passive or active subsystems interspersed with, and providing a tension member between, the several lengths. An example is illustrated in FIG. 9.

The upper airship additionally comprises:
a) a parafoil and parafoil control subsystem adapted to adjust dynamic lift and drag;
b) a parachute (drogue chute) and parachute control subsystem adapted to adjust drag;
c) a tether attachment subsystem;
d) a solar power generator, such as a photovoltaic system adapted to generate electric power during periods of daylight, storage batteries, and associated power management and distribution systems.

The tether attachment subsystem may be adapted to control the point at which tension forces are applied, and to also control the angle of attack of the airship, as illustrated in FIG. 3; alternatively, the tether attachment system may comprise a single fixed point of attachment as suited to a spherical balloon, or a distributed system that also comprises the parachute and parafoil anchor points (equipment assemblies) as illustrated in FIG. 9 (i.e., in an embodiment where the parachute and parafoil equipment assemblies serve as connecting members between separate lengths of the tether).

The lower airship additionally comprises:
a) a parafoil and parafoil control subsystem adapted to adjust dynamic lift and drag. The parafoil may be partially filled with a heavier-than air gas, such as carbon dioxide, to keep the parafoil below the airship in zero-wind conditions and also to facilitate inflation;
b) a parachute (drogue chute) and parachute control subsystem adapted to adjust drag;
c) a tether attachment/deployment subsystem adapted to control the length of the tether, the point at which tension forces are applied to the lower airship, and the angle of attack of the airship relative to the ambient wind;
d) a solar power generator, such as a photovoltaic system adapted to generate electric power during periods of daylight, storage batteries, and associated power management and distribution systems;
e) a wind generator adapted to generate electric power during periods of relative wind;
f) a propulsion and guidance system, such as a system of electric motors and propellers, optionally including aerodynamic control surfaces, adapted to provide propulsion (thrust) to the lower airship. The propulsion system can optionally be integrated with the wind generator.

The lower airship can also comprise a power generation system based solely on solar or wind, as opposed to a combination of the two. It is expected that the lower airship, at least, will additionally contain a payload; however, this is not a required element of the inventive concept. Possible payloads include radar, electronic warfare, and communications relay packages, atmospheric sensing packages (e.g., aerosols, temperature, pressure, humidity), remote sensing and earth sciences packages (IR, visible, ultraviolet sensors), astrophysical and astronomical sensors, and "beamed power" subsystems (if significant amounts of excess power can be generated on the airships). The tether itself, and a possible physical shuttle running on the tether, might represent a useful prototype or testbed for a future space elevator.

The preceding description has been presented only to illustrate and describe examples of the principles described. In some of the figures the relative dimensions of components have been altered for purposes of description. This description is not intended to be exhaustive or to limit these principles to any precise form disclosed. Many modifications and variations are possible in light of the above teaching.

What is claimed is:

1. A method for launch of an airship comprising:
connecting a cargo airship to a deflated second airship;
launching the cargo airship, the cargo airship carrying the second airship aloft;
inflating the second airship with lifting gas carried by the cargo airship while aloft;
releasing the second airship from the cargo airship; and
deploying a parafoil from the second airship, said parafoil adapted to operate while the second airship is inflated with lifting gas.

2. The method of claim 1, in which the second airship is a high-altitude airship.

3. The method of claim 1, further comprising placing the cargo airship in drifting flight during inflation of the second airship.

4. The method of claim 1, in which lifting gas is stored in a cryogenic or pressurized container; after the lifting gas in the cryogenic or pressurized container is depleted, jettisoning the cryogenic or pressurized container.

5. The method of claim 1, further comprising performing a hull integrity check subsequent to launch of the cargo airship and prior to releasing the second airship from the cargo airship.

6. The method of claim 5, further comprising releasing the second airship when the hull integrity check does not detect a breach in the second airship and restowing the second airship by removing the lifting gas from the second airship when the hull integrity check detects a breach in the second airship.

7. The method of claim 1, wherein inflating the second airship with lifting gas carried by the cargo airship while aloft comprises passing the lifting gas through an inflation tube fluidly coupled to the second airship in which the inflation tube terminates in the crown of the second airship.

8. The method of claim 1, in which:
   connecting a cargo airship to a deflated second airship comprises stowing a high-altitude airship in a payload bay of the cargo airship;
   inflating the high-altitude airship with lifting gas comprises opening a commandable valve to allow lifting gas to flow through an inflation tube into the high-altitude airship such the high-altitude airship inflates and progressively lifts the high-altitude airship out of a payload bay; and
   releasing the high altitude airship comprises releasing a payload connected to the high-altitude airship from the cargo airship, the high-altitude airship lifting the payload from the payload bay.

9. The method of claim 8, in which stowing the high-altitude airship in the cargo airship comprises wrapping the high-altitude airship around a reel in the payload bay.

10. The method of claim 9, further comprising loading the payload of the high-altitude airship into the center of the reel and opening the reel to release the payload.

11. The method of claim 8, in which stowing the high-altitude airship in the payload bay of the cargo airship comprises folding the high-altitude airship in the payload bay.

12. The method of claim 8, further comprising opening a payload bay door prior to inflation of the high-altitude airship.

13. The method of claim 8, further comprising closing the commandable valve after a desired amount of lifting gas has been transferred to the high-altitude airship.

14. The method of claim 8, in which at least a portion of the lifting gas is transferred from ballonets of the cargo airship to the high-altitude airship.

15. A high-altitude airship launch system comprising:
   high-altitude airship comprising:
      a hull;
      an inflation tube comprising a first end connected to a gas source and a second end terminating in the high-altitude airship; and
      a parachute adapted to be deployed from the high-altitude airship and operate while the high-altitude airship is inflated with lifting gas; and
   a cargo airship comprising:
      a lifting gas reservoir; and
      a commandable valve;
   in which the cargo airship is configured to transport the high-altitude airship aloft and inflate the high-altitude airship while in flight by opening the commandable valve and passing lifting gas from the lifting gas reservoir through the inflation tube into the high-altitude airship.

16. The system of claim 15, in which the inflation tube is disposed inside the hull of the high-altitude airship.

17. The system of claim 15, in which the second end of the inflation tube terminates near a crown of the hull.

18. The system of claim 15, in which the inflation tube passes through a gore in the hull of the high-altitude airship.

19. The system of claim 15, in which the cargo airship further comprises an internal payload bay configured to receive the high-altitude airship.

20. The system of claim 19, in which the cargo airship further comprises a retractable payload door on an upper surface of the cargo airship.

21. The system of claim 15, in which the cargo airship further comprises a reel disposed in the payload bay, the high-altitude airship being wrapped around the reel such that the crown is exposed and the inflation tube maintains an open cross section along the length of the inflation tube.

22. The system of claim 21, in which a payload of the high-altitude airship is contained with the reel, the reel comprising movable segments configured to open to release the payload.

23. The system of claim 15, in which the inflation tube further comprises a diffuser at the second end.

24. The system of claim 15, further comprising a tether connecting the high-altitude airship and the cargo airship, the tether having a length sufficient to allow a separation of at least 10 kilometers between the high-altitude airship and the cargo airship.

25. The system of claim 24, in which at least a portion of the tether is wrapped around a reel, the reel comprising a commandable motor configured to rotate the reel to uptake the tether and a brake configured to controllably release the tether from the reel.

26. A cargo airship comprising:
   a payload bay;
   a retractable payload door on an upper surface of the cargo airship;
   a lifting gas reservoir;
   a commandable valve configured to control transfer of gas from the lifting gas reservoir to a high-altitude airship; and
   a parafoil deployable from the high-altitude airship, said parafoil adapted to operate while the high-altitude airship is inflated with lifting gas.

27. A high-altitude airship comprising:
   a hull with a crown;
   an inflation tube comprising a first end connected to a controllable valve at a base of the high-altitude airship and a second end terminating near the crown of the high-altitude airship; and
   a parachute associated with the high-altitude airship, said parachute adapted to deploy from the high-altitude airship and operate while the high-altitude airship is inflated with lifting gas;
   in which the inflation tube is configured to receive lifting gas from an external source and convey the lifting gas to the crown.

* * * * *